United States Patent
Madsen et al.

(10) Patent No.: US 10,386,910 B2
(45) Date of Patent: Aug. 20, 2019

(54) DATA STORAGE POWER MANAGEMENT

(71) Applicant: SEAGATE TECHNOLOGY LLC, Cupertino, CA (US)

(72) Inventors: Christian Bruun Madsen, Longmont, CO (US); Christopher Ryan Dienes, Mead, CO (US); Andrei Khurshudov, Niwot, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 69 days.

(21) Appl. No.: 15/812,036

(22) Filed: Nov. 14, 2017

(65) Prior Publication Data

US 2018/0081415 A1  Mar. 22, 2018

Related U.S. Application Data

(63) Continuation of application No. 14/820,173, filed on Aug. 6, 2015, now Pat. No. 9,846,470.

(51) Int. Cl.
| | |
|---|---|
| *G06F 1/32* | (2019.01) |
| *G06F 1/3206* | (2019.01) |
| *G06F 1/3209* | (2019.01) |
| *G06F 1/3234* | (2019.01) |

(52) U.S. Cl.
CPC .......... *G06F 1/3206* (2013.01); *G06F 1/3209* (2013.01); *G06F 1/3268* (2013.01); *Y02D 10/154* (2018.01); *Y02D 50/20* (2018.01)

(58) Field of Classification Search
CPC .... G06F 1/3206; G06F 1/3209; G06F 1/3268; Y02D 10/154; Y02D 50/20
See application file for complete search history.

(56) References Cited

U.S. PATENT DOCUMENTS

| | | | |
|---|---|---|---|
| 5,966,510 A | 10/1999 | Carbonneau et al. | |
| 6,721,355 B1 | 4/2004 | McClennon et al. | |
| 7,715,710 B2 | 5/2010 | Wan et al. | |
| 7,904,651 B2 * | 3/2011 | Muramatsu | G11B 33/128 711/114 |
| 8,205,048 B2 * | 6/2012 | Muramatsu | G11B 33/128 711/161 |
| 8,555,008 B2 * | 10/2013 | Muramatsu | G11B 33/128 711/161 |
| 8,688,394 B2 | 4/2014 | El-Essawy et al. | |

(Continued)

OTHER PUBLICATIONS

Adaptive Power Management for Mobile Hard Drives, IBM Corporation, Apr. 1999 (11 pp.).

*Primary Examiner* — Abdelmoniem I Elamin
(74) *Attorney, Agent, or Firm* — Holland & Hart LLP

(57) ABSTRACT

Systems and methods for data storage power management are described. In one embodiment, the method includes analyzing metrics collected from one or more storage devices, identifying, based at least in part on analyzing the metrics, a pattern of activity for at least one of the one or more storage devices over a predetermined period of time, generating a control model based at least in part on the identified pattern of activity, and modifying a power mode of at least one of the one or more storage devices based on the control mode. The control model indicate a first time period when at least one of the one or more storage devices is active and a second time period when at least one of the one or more storage devices is inactive.

17 Claims, 9 Drawing Sheets

(56) References Cited

U.S. PATENT DOCUMENTS

| | | |
|---|---|---|
| 8,789,061 B2 | 7/2014 | Pavel et al. |
| 9,235,251 B2 | 1/2016 | Gargash et al. |
| 2006/0259803 A1 | 11/2006 | Edwards et al. |
| 2009/0063883 A1 | 3/2009 | Mori |
| 2010/0100716 A1 | 4/2010 | Scott et al. |
| 2010/0138677 A1* | 6/2010 | Pagan .................. G06F 3/0625 713/320 |
| 2010/0241888 A1 | 9/2010 | Kaneko et al. |
| 2011/0213994 A1 | 9/2011 | Thereska et al. |
| 2012/0226928 A1* | 9/2012 | Muramatsu .......... G11B 17/228 713/324 |
| 2012/0324162 A1 | 12/2012 | Fukatani et al. |
| 2013/0219196 A1 | 8/2013 | Finkelstein et al. |
| 2014/0157026 A1 | 6/2014 | So et al. |
| 2014/0281640 A1* | 9/2014 | Nelson ..................... G06F 1/26 713/330 |
| 2015/0140955 A1 | 5/2015 | Chakraborty et al. |
| 2016/0098076 A1 | 4/2016 | Chng et al. |

* cited by examiner

DATA STORAGE POWER MANAGEMENT

RELATED APPLICATIONS

This application is a continuation of U.S. patent application Ser. No. 14/820,173, filed on 6 Aug. 2015 and entitled DATA STORAGE POWER MANAGEMENT, issued as U.S. Pat. No. 9,846,470 on 19 Dec. 2017, the disclosure of which is incorporated in its entirety by this reference.

SUMMARY

According to at least one embodiment, a computer-implemented method for data storage power management is described. In one embodiment, the method may include analyzing metrics collected from one or more storage devices, identifying, based at least in part on analyzing the metrics, a pattern of activity for at least one of the one or more storage devices over a predetermined period of time, generating a control model based at least in part on the identified pattern of activity, and modifying a power mode of at least one of the one or more storage devices based on the control mode. The control model may indicate a first time period when at least one of the one or more storage devices is active and a second time period when at least one of the one or more storage devices is inactive.

In one embodiment, the method may include generating a periodogram from the analysis of the metrics, the periodogram indicating a frequency of activity and a frequency of inactivity relative to at least one of the one or more storage devices. In some cases, analyzing the metrics may be based at least in part on Fourier analysis of the metrics, the periodogram being generated based at least in part on the Fourier analysis. In some embodiments, the power mode includes at least one of an active mode, an idle mode, a standby mode, and a sleep mode. In one configuration, the one or more storage devices includes a data storage enclosure with at least one tray of drives, where each tray of drives includes a plurality of storage drives.

In one embodiment, the method may include modifying a power mode of at least one tray of drives within the data storage enclosure based at least in part on a spatial pattern identified in the pattern of activity. The method may include modifying a power mode of a storage drive within the data storage enclosure based at least in part on the pattern of activity. Additionally, or alternatively, the method may include modifying a power mode of the data storage enclosure based at least in part on the pattern of activity.

In one embodiment, the method may include storing administrator settings, wherein the administrator settings include at least a configuration for performance and a configuration for power savings relative to the one or more storage devices. In some cases, upon approaching or entering an active period while in an inactive period, the method may include placing a storage device in a standby mode based on a configuration for power savings and/or placing a storage device in an active mode based on a configuration for performance.

A computing device configured for data storage power management is also described. The device may include a processor and memory in electronic communication with the processor. The memory may store instructions that are executable by the processor for the steps of analyzing metrics collected from one or more storage devices, identifying, based at least in part on analyzing the metrics, a pattern of activity for at least one of the one or more storage devices over a predetermined period of time, generating a control model based at least in part on the identified pattern of activity, and modifying a power mode of at least one of the one or more storage devices based on the control mode. The control model may indicate a first time period when at least one of the one or more storage devices is active and a second time period when at least one of the one or more storage devices is inactive.

A computer-program product for data storage power management is also described. The computer-program product may include a non-transitory computer-readable medium that stores instructions. The instructions may be executable by a processor for the steps of analyzing metrics collected from one or more storage devices, identifying, based at least in part on analyzing the metrics, a pattern of activity for at least one of the one or more storage devices over a predetermined period of time, generating a control model based at least in part on the identified pattern of activity, and modifying a power mode of at least one of the one or more storage devices based on the control mode. The control model may indicate a first time period when at least one of the one or more storage devices is active and a second time period when at least one of the one or more storage devices is inactive.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
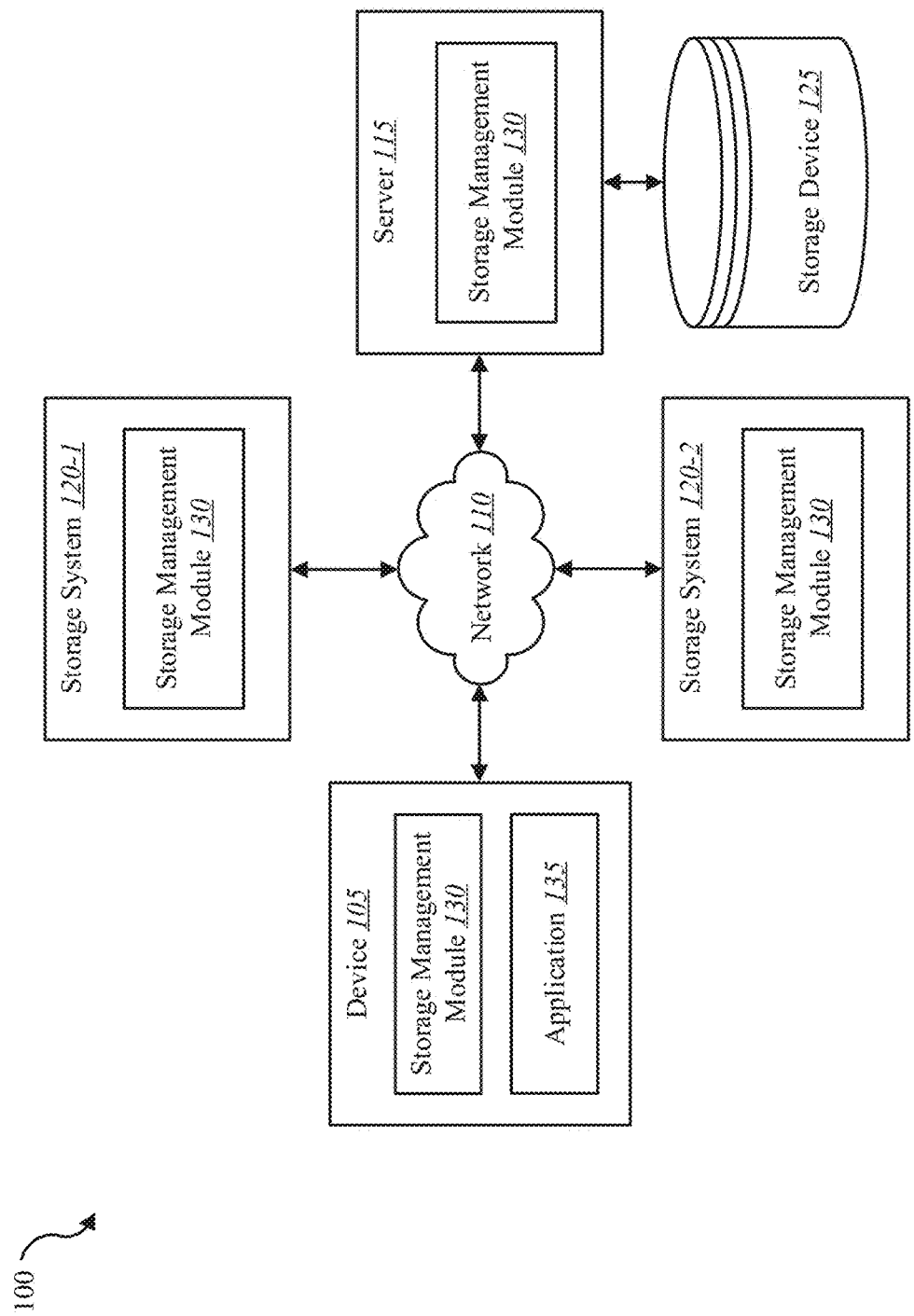
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed.

Rather, the instant disclosure covers all modifications, equivalents, and alternatives falling within the scope of the appended claims.

DETAILED DESCRIPTION OF EXEMPLARY EMBODIMENTS

The systems and methods described herein relate to data storage power management. More specifically, the systems and methods described herein relate to data storage power management in relation to a distributed data system such as a cloud storage system as one example. The present systems and methods include monitoring contextual metrics for storage drives in a datacenter. Monitoring may include tracking a drive's workload such as tracking a level of reads and/or writes. The resulting datasets may be mined and analyzed to identify patterns using automated mathematical algorithms such as Fourier analysis or machine learning. The patterns may indicate when powering down a drive does not affect time periods of critical workloads and when to spin the drive back up to avoid latency and lapses in service. The dynamic storage management described herein has been shown to provide power savings for a typical datacenter, such as greater than 50% power savings for a typical datacenter.

The system and methods may include monitoring drive attributes and controlling drive power modes adaptively through collective and continued monitoring of a datacenter. Managing the datacenter as indicated herein cannot be accomplished based on the conventional individual drive management basis, where each drive is managed independent of other drives and the datacenter as a whole. The systems and methods described herein may be automated so no human intervention is needed. The systems and methods described herein may include a software layer to collectively monitor contextual drive metrics (e.g., drive reads and writes) to record when drives are busy and when they are idle from a utilization point of view. After gathering these metrics for a predetermined period of time (e.g., a week, 2 weeks, etc.), the systems and methods may apply mathematical approaches such as Fourier analysis or machine learning on the collected dataset to discover temporal and/or spatial patterns in the drive activity and generate a mathematical model that indicates when and how to turn on and off the drives of a datacenter. The drive power will then be managed based at least in part on one or more monitored drive features such as drive idle timers and/or standby timers, drive idle and standby commands (e.g., placing a drive in an idle mode, standby mode, sleep mode, etc.), turning off an entire drive tray using enclosure management, etc. In some cases, the determination whether to leverage timers, commands or enclosure management may depend on whether the identified patterns of drive activity are temporally periodic, irregular but predictable, and/or whether the patterns are spatial.

In some embodiments, the systems and methods may include balancing performance optimization against power savings by applying various restrictions to availability. For instance, the systems and methods may include penalizing increases in latency against rewards on power savings and/or using a combination of both storage drive, drive tray, and enclosure power modes. In some cases, the systems and methods may maintain a predefined minimum number of drives ready to operate based on the workload analysis. To control the number of powered-on drives, the systems and methods may manage workloads by integrating with storage and administration software applications.

FIG. 1 is a block diagram illustrating one embodiment of an environment 100 in which the present systems and methods may be implemented. The environment 100 may include device 105, network 110, server 115, storage systems 120-1 and 120-2, and storage device 125.

Examples of the device 105 include terminals, mobile devices, smart phones, personal computing devices, tablets, laptops, desktops, servers, a set top box providing access to media content, gaming consoles, home automation systems, data storage systems, data storage enclosures, and generally any computing device able to connect to a data communication network. Examples of server 115 may include a data storage enclosure, a storage server, store controller, cloud server, a data server, a corporate server, a home automation server, etc.

In some configurations, device 105 may include a storage management module 130 and an application 135. Examples of application 135 may include any combination of a program installed on a server, a program installed on a personal computer, a mobile application installed on a mobile computing device, a web browser, a web-based application (e.g., any combination of JavaScript, hypertext markup language (HTML), and cascading style sheets (CSS)), etc. In some embodiments, application 135 may be installed on device 105 to enable a user of device 105 to interface with a function of server 115, storage systems 120, storage device 125, and/or storage management module 130. For example, application 135 may allow device 105 to interface with the storage management module 130 on another device such as on server 115 and/or a storage system 120. In some cases, server 115 may include an application similar to application 135 to enable server 115 to interface with device 105, storage systems 120, etc.

In some embodiments, device 105 may communicate with server 115 via network 110. Examples of network 110 may include cloud networks, local area networks (LAN), wide area networks (WAN), virtual private networks (VPN), wireless networks (using 802.11, for example), cellular networks (using 3G and/or LTE, for example), etc. In some configurations, the network 110 may include the Internet.

In some embodiments, at least one of the storage systems 120 may include a storage management module (e.g., storage management module 130), where at least a portion of the functions of storage management module 130 are performed separately and/or concurrently on storage system 120-1 and/or storage system 120-2. In one example, storage systems 120 include distributed data system storage systems. Storage systems 120 may include cloud storage systems, distributed data systems, file hosting services, datacenters, etc. In some cases, storage systems 120 may include one or more data storage enclosures with one or more racks or trays of storage drives. Additionally, or alternatively, storage systems 120 may include Just a Bunch Of Drives (JBOD) connected to a storage server.

As illustrated, server 115 may be coupled to storage device 125. In some cases, storage device 125 may include one or more storage drives. In one embodiment, server 115 may include a data storage server and/or a data storage controller. In some embodiments, storage device 125 may include a cloud storage system of storage drives and/or storage devices of a file hosting service. In some cases, storage device 125 may include data storage enclosures with one or more racks of storage drives. Additionally, or alternatively, storage device 125 may include Just a Bunch Of Drives (JBOD) controlled and/or accessed via server 115.

In some embodiments, device 105, storage systems 120, and/or server 115 may each include a storage management module where at least a portion of the functions of storage management module 130 are performed separately and/or concurrently on device 105, storage systems 120, and/or server 115. Storage management module 130 may be configured to protect data stored on storage systems 120. In one example, storage management module 130 may monitor workloads relative to storage systems 120, server, 115, and/or storage device 125. Storage management module 130 may analyze the monitored workloads to identify time periods of critical and non-critical workloads. Storage management module 130 may modify power modes of data storage drives, data storage trays, and/or data storage enclosures based on the identified time periods of critical and non-critical workloads. Thus, storage management module 130 may manage power settings for datacenters according to an analysis of datacenter workloads. Further details regarding the storage management module 130 are discussed below.

Figure 2:
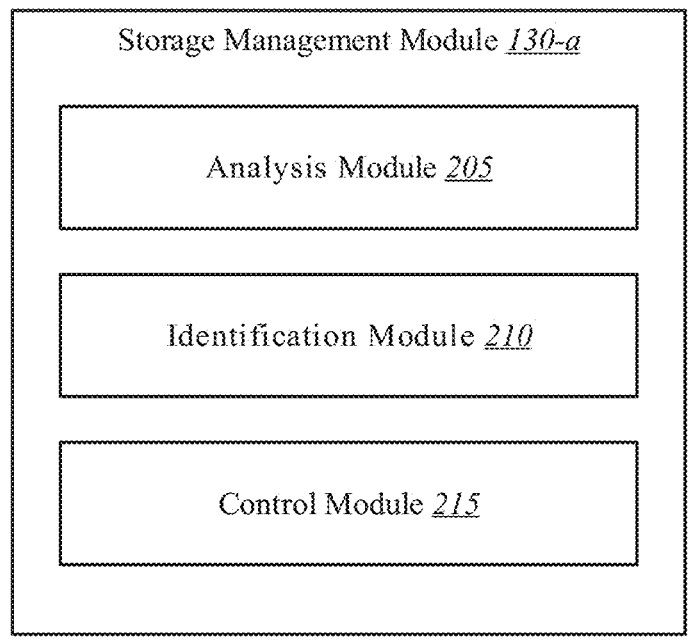
FIG. 2 is a block diagram illustrating one example of a storage management module.

FIG. 2 is a block diagram illustrating one example of a storage management module 130-*a*. Storage management module 130-*a* may be one example of storage management module 130 depicted in FIG. 1. As depicted, storage management module 130-*a* may include analysis module 205, identification module 210, and control module 215. In one embodiment, at least one aspect of storage management module 130-*a* may include software and/or hardware elements of a networked data storage system. For example, the storage management module 130-*a* may be part of a distributed data system and/or datacenter such as a cloud storage system configured to store data in a secure data environment.

In one embodiment, analysis module 205 may analyze metrics collected from one or more storage devices. For example, analysis module 205 may collect metrics from storage systems 120, server 115, and/or storage device 125 of FIG. 1. In some embodiments, analyzing the metrics may be based at least in part on Fourier analysis of the metrics. In some embodiments, identification module 210 may identify, based at least in part on the analysis module 205 analyzing the metrics, a pattern of activity for at least one of the one or more storage devices over a predetermined period of time. In some cases, the identification module 210 may identify a critical load period and/or a non-critical load period for at least one of the one or more storage devices based on the identified patterns of activity. The storage devices analyzed may include one or more non-volatile hard drives such as hard disk drives, solid state drives, hybrid drives, etc. In some cases, the one or more storage devices may include RAID and/or Non-RAID storage systems. In one embodiment, the one or more storage devices may include storage servers, storage controllers, and/or storage enclosures. In some cases, a storage enclosure may be filled with one or more trays, each tray holding multiple drives. Additionally, or alternatively, the one or more storage devices may include a server connected to just a bunch of drives (JBOD), etc. In one embodiment, the pattern of activity identified by the identification module 210 may include patterns of when the one or more storage devices are active and/or inactive. For example, the pattern of activity may indicate a frequency of activity such as indicating a storage device is active for one hour every Monday at 9:00 AM, active again every Monday at 1:00 PM, inactive every Sunday from 6:00 AM to 11:00 AM, and so forth.

In one embodiment, the pattern of activity may be based on a periodic pattern of activity such as when a storage device is active and when a storage device is not active. Additionally, or alternatively, the pattern of activity may be based on a spatial pattern of activity. Spatial patterns may be based on identifying which storage drives among multiple storage drives on a tray are active and which are inactive, identifying which trays among multiple trays on a data storage enclosure are active and which are inactive, and/or identifying which data storage enclosures among multiple data storage enclosures of a datacenter are active and which are inactive, etc. For example, the spatial pattern may indicate that an entire tray of storage drives in a data storage enclosure are inactive. If the tray included ten drives, then one embodiment may include ten operations of adjusting the power modes of each individual drive. Additionally, or alternatively, an identified spatial pattern may enable the control module 215 to adjust a power mode of the tray, thus achieving in a single operation the same result of adjusting each individual storage drive on that tray.

In one embodiment, control module 215 may generate a control model based at least in part on the pattern of activity identified by the identification module 210. The control model may indicate a first time period when at least one of the one or more storage devices is active and a second time period when at least one of the one or more storage devices is inactive. In some embodiments, control module 215 may modify a power mode of at least one of the one or more storage devices based on the control model. The power mode may include at least one of an active mode, an idle mode, a standby mode, and a sleep mode. In active mode, all or a majority of drive electronics may be fully powered, the disk drive heads may be loaded, and the disks spinning at full RPM. In a first idle mode, power to at least a portion of the drive electronics may be reduced and/or removed. In a second idle mode, the drive heads may be unloaded while the disks remain spinning at full RPM. In a third idle mode, the drive heads may be unloaded and the disks may spin at a reduced RPM. In standby mode, the drive heads may be unloaded and the disk motor stopped (disks not spinning). In sleep mode, power may be removed from or reduced to all components of a disk drive except for those components needed to bring the disk drive back to a standby mode, idle mode, and/or active mode. In some cases, the control module 215 may place a storage drive into any combination of the described power modes such as a combination of the first idle mode (reduced electronics) and the third idle mode (drive heads unloaded and disks spinning at reduced RPM), for example. In some embodiments, control module 215 may determine the time it takes to take a storage drive from a first mode (e.g., sleep mode, standby mode, sleep mode, etc.) to a second mode (e.g., active mode, idle mode, standby mode, etc.). As one example, control module 215 may determine that it takes 3 minutes for a drive to go from sleep mode to active mode, 1 minute to go from standby mode to active mode, and 10 seconds to go from one of the idle modes to active mode, etc. If the control model specifies that a storage device is to be active at 9:15 PM and the storage device is in sleep mode, then the control module 215 may initiate the transition from sleep mode to active mode at least by 9:12 PM so that the storage device is fully operational in the active mode by 9:15 PM.

In one embodiment, control module 215 may generate a periodogram from the analysis of the metrics. The periodogram may indicate a frequency of activity and a frequency of inactivity relative to at least one of the one or more storage devices. The periodogram may be generated based at least in part on the Fourier analysis performed by the analysis module 205. As described above, the one or more storage devices may include a data storage enclosure. The data storage enclosure may include at least one tray of drives, and each tray of drives may include a plurality of storage drives.

In some embodiments, control module 215 may modify a power mode of at least one tray of drives within the data storage enclosure based at least in part on a spatial pattern identified in the pattern of activity. For example, with 5 trays in an enclosure (tray #1 to tray #5) and 10 drives per tray, identification module 210 may determine that tray #2 is not active for a particular time period. Accordingly, control module 215 may remove and/or reduce power to tray #2 during the identified time period, while maintaining power to the enclosures, trays, and/or drives identified as active during the same time period. In some cases, identification module 210 may determine that disks A, E, and J of disks A-J on tray #4 are not active for a particular time period. Accordingly, control module 215 may remove and/or reduce power to disks A, E, and J during the identified time period, while maintaining power to enclosures, trays, and/or drives identified as active during the same time period. Accordingly, control module 215 may modify a power mode of a storage drive on a tray within a data storage enclosure based at least in part on an identified pattern of activity, modify a power mode of the tray within the data storage enclosure based at least in part on an identified pattern of activity, and/or modify a power mode of the data storage enclosure based at least in part on an identified pattern of activity. For example, in some cases, control module 215 may remove all power from a disk, tray, and/or data storage enclosure based on an identified pattern of activity.

In some embodiments, control module may store administrator settings relative to one or more identified patterns of activity. In some cases, the administrator settings may include at least a configuration for performance and a configuration for power savings relative to the one or more storage devices. For example, the administrator settings may specify a preference for performance among one or more drives, trays, and/or storage enclosures, and/or specify a preference for power savings among one or more drives, trays, and/or storage enclosures. Thus, control module 215 may use the administrator settings in conjunction with one or more identified patterns of activity to determine which power mode to apply to a drive, tray, and/or storage enclosure. For example, upon approaching or entering an active period specified by an identified pattern of activity while in an inactive period, control module 215 may take a storage device out of a sleep mode and place the device in a standby mode or idle mode based on a configuration for power savings as specified in the administrator settings. In some embodiments, control module 215 may take a storage device out of sleep mode (or any other mode) and place the device in an active mode based on a configuration for performance as specified in the administrator settings.

Figure 3:
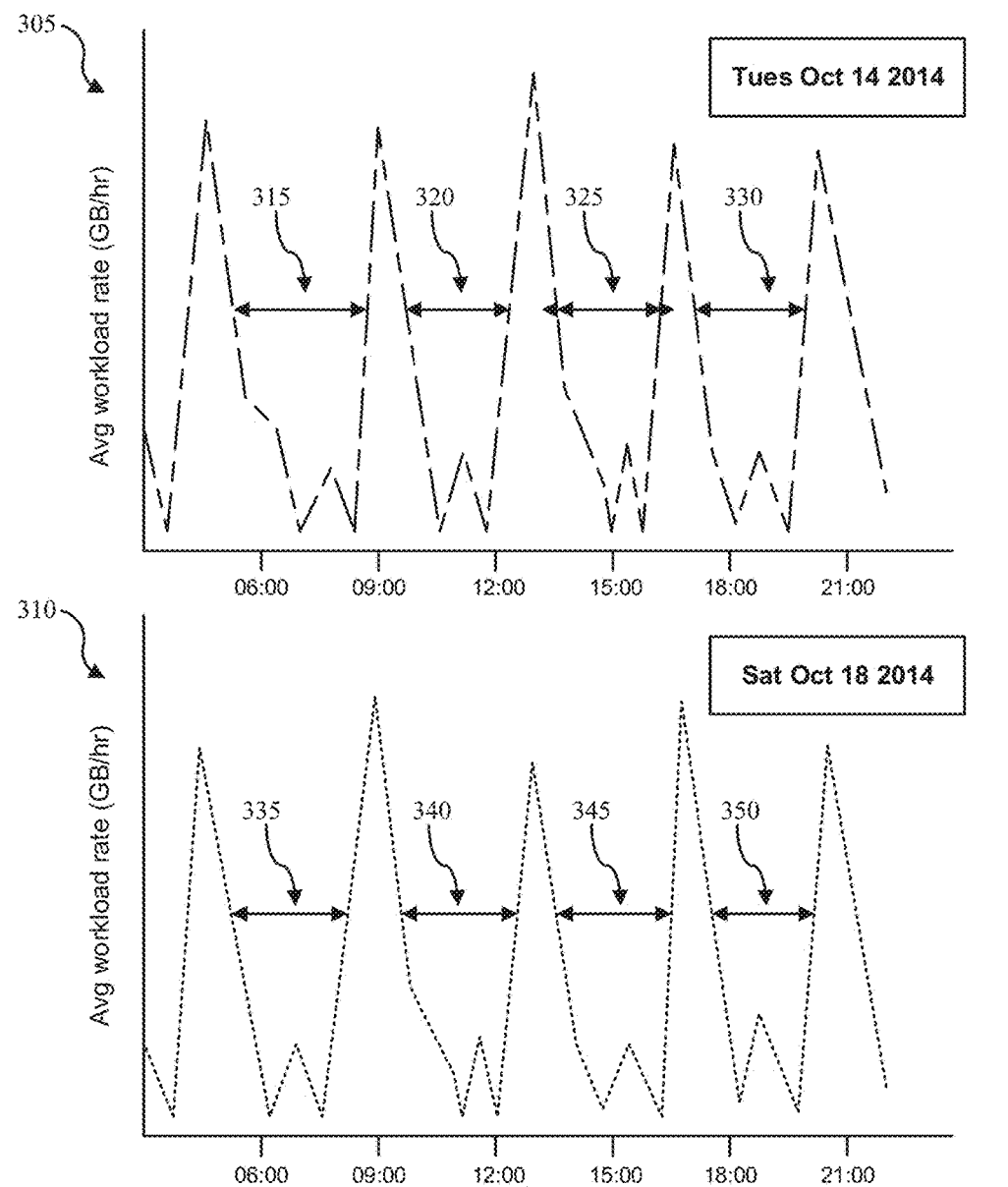
FIG. 3 is a diagram illustrating one example of a graphical set by which the present systems and methods may be implemented.

FIG. 3 is a diagram illustrating one example of a graphical set 300 by which the present systems and methods may be implemented. One or more aspects of the graphical set 300 may be implemented in conjunction with storage management module 130 of FIGS. 1 and/or 2.

As described above, one or more samples of a workload of a storage device may be collected and analyzed. The storage device may include any combination of data storage drives, data storage trays, and data storage enclosures. In one example, a first sample of a workload of the storage device may be taken Tuesday Oct. 14, 2014 from at least 4:00 AM to 9:00 PM and a second sample may be taken Saturday Oct. 18, 2014 from at least 4:00 AM to 9:00 PM. Thus, the first graph 305 may represent the sampled workload of the storage device on a particular day and the second graph 310 may represent the sampled workload of the storage device on another particular day.

The sample workloads may be analyzed to identify time periods of non-critical and critical workloads. As illustrated in the exemplary graph 305, the first non-critical time period 315 may be identified as from 5:15 AM to 8:45 AM, the second non-critical time period 320 from 9:45 AM to 12:20 PM, the third non-critical time period 325 from 1:30 PM to 4:15 PM, and the fourth non-critical time period 330 from 5:10 PM to 7:55 PM. Thus, the critical workload periods for the Tuesday sample may include 4:10 AM to 5:15 AM, 8:45 AM to 9:45 AM, 12:20 PM to 1:30 PM, 4:15 PM to 5:10 PM, and 7:55 PM to 9:05 PM.

As illustrated in the exemplary graph 310, the first non-critical time period 335 may be identified as from 5:15 AM to 8:15 AM, the second non-critical time period 340 from 9:30 AM to 12:30 PM, the third non-critical time period 345 from 1:30 PM to 4:30 PM, and the fourth non-critical time period 350 from 5:30 PM to 8:10 PM. Thus, the critical workload periods for the Saturday sample may include 4:10 AM to 5:15 AM, 8:15 AM to 9:30 AM, 12:30 PM to 1:30 PM, 4:30 PM to 5:30 PM, and 8:10 PM to 9:15 PM.

In some embodiments, the sampled data may be analyzed. For example, the sampled data may be analyzed based on Fourier analysis. The results of the analysis may be used to generate a control model. In one embodiment, the control model may specify that the sampled storage device be placed in a non-active mode (e.g., idle mode, standby mode, sleep mode, etc.) during identified non-critical workload time periods and placed in some form of an active mode (e.g., active mode, idle mode, standby mode, etc.) during identified critical workload time periods. The control model may include critical and non-critical load periods based on a comparison of the Tuesday sample to the Saturday sample. The control model may include start times for the non-critical periods based on the latest time of inactivity between the two samples and select end times for the earliest times of activity between the two samples. Thus, if the Tuesday sample indicates inactivity starting at 8:30 AM and the Saturday sample indicates inactivity starting at 8:40 AM, the control model may include the latest start time, 8:40 AM, as the beginning of a non-critical time period and end of a critical workload time period. Also, if the Tuesday sample indicates inactivity ending at 9:15 AM and the Saturday sample indicates inactivity ending at 9:20 AM, then the control model may include the earliest end time, 9:15 AM, as the end of the non-critical time period and start of a critical workload time period. In some cases, the control model start/end times may be adjusted based on an estimated time to recovery or start up time. For example, taking the 9:15 AM as the control model start of the critical workload time period, if it takes 2 minutes to bring a storage device from sleep mode to active mode and then the start time may be adjusted back 2 minutes to 9:13 AM.

In some embodiments, a period of a non-critical workload and/or critical workload may be based at least in part on the measured workload rising above and/or falling below a predetermined threshold. In some cases, the period of non-critical workload and/or critical workload may depend on the measured workload falling below or rising above the predetermined threshold and staying above or below the predetermined threshold for a predefined period of time. For example, a non-critical workload may be identified based on a workload remaining below 10% system capacity for 5 minutes or longer. The percentage of system capacity may be based on a percentage of CPU capacity used, percentage of memory used, percentage of disk drive transfer rate, etc. As another example, any workload that falls below a threshold of 0.05 Gigabytes per hour (GB/hr) and remains below this threshold for a predefined time period (e.g., below 0.05 GB/hr for at least 15 minutes, etc.) may be identified as a non-critical workload time period.

Figure 4:
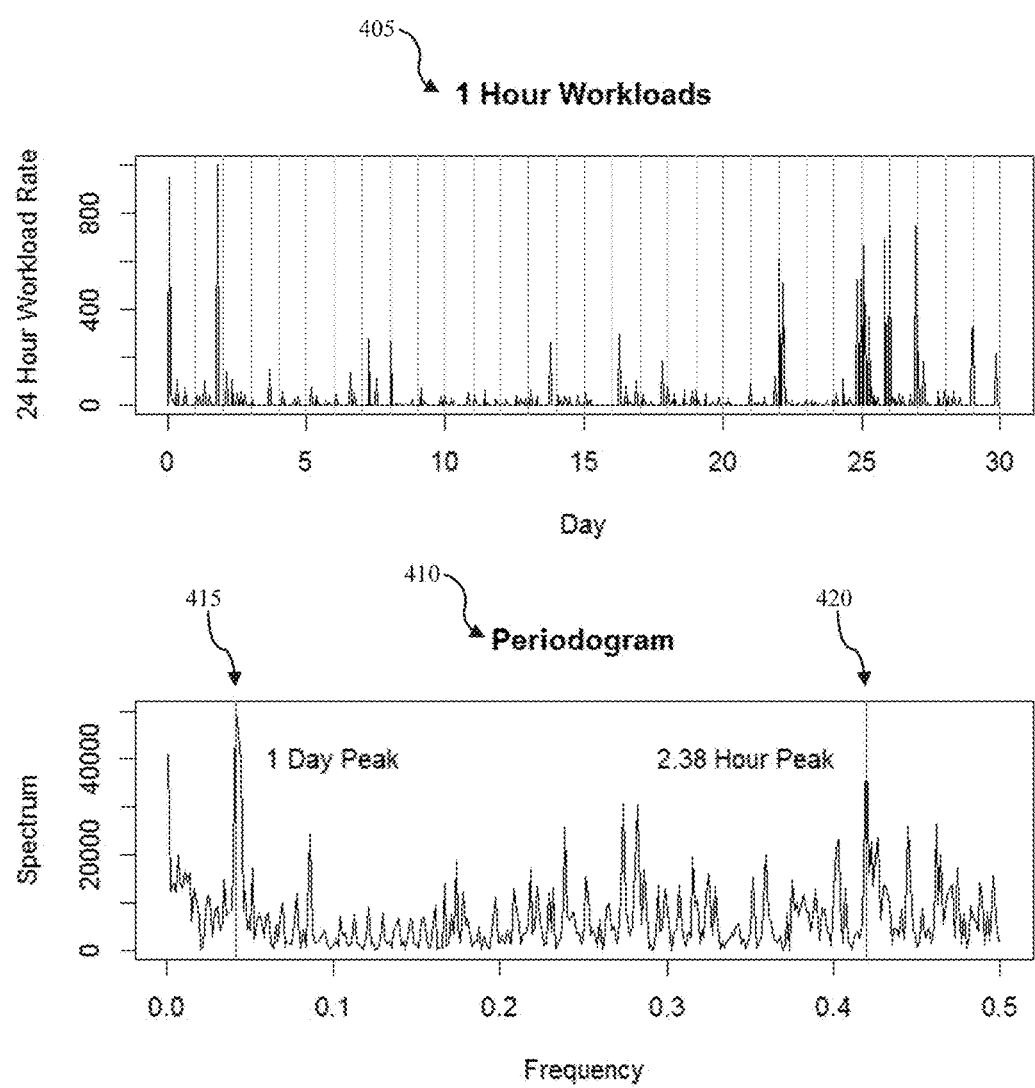
FIG. 4 is a diagram illustrating one example of a graphical set by which the present systems and methods may be implemented.

FIG. 4 is a diagram illustrating one example of a graphical set 400 by which the present systems and methods may be implemented. One or more aspects of the graphical set 400 may be implemented in conjunction with storage management module 130 of FIGS. 1 and/or 2.

Sample workloads may be summarized and analyzed to identify reoccurring periods of non-critical and critical workloads. As illustrated in the exemplary graph 405, workloads for a particular storage device are summarized into 1 hour bins, scaled at a 24 hour rate, and graphed for a period of 1 month. As illustrated in the exemplary graph 410, summarized workload data may be analyzed using a periodogram. From the periodogram depicted in graph 410, frequencies labeled by 415 and 420 represent several dominant frequencies which indicate possible periodicities of non-critical and critical workload patterns. In this case, 415 and 420 represent the 24 hour and 2.38 hour frequencies; respectively. In some embodiments, selected periodogram frequencies may be incorporated in mathematical models to determine the optimal drive power state.

Figure 5:
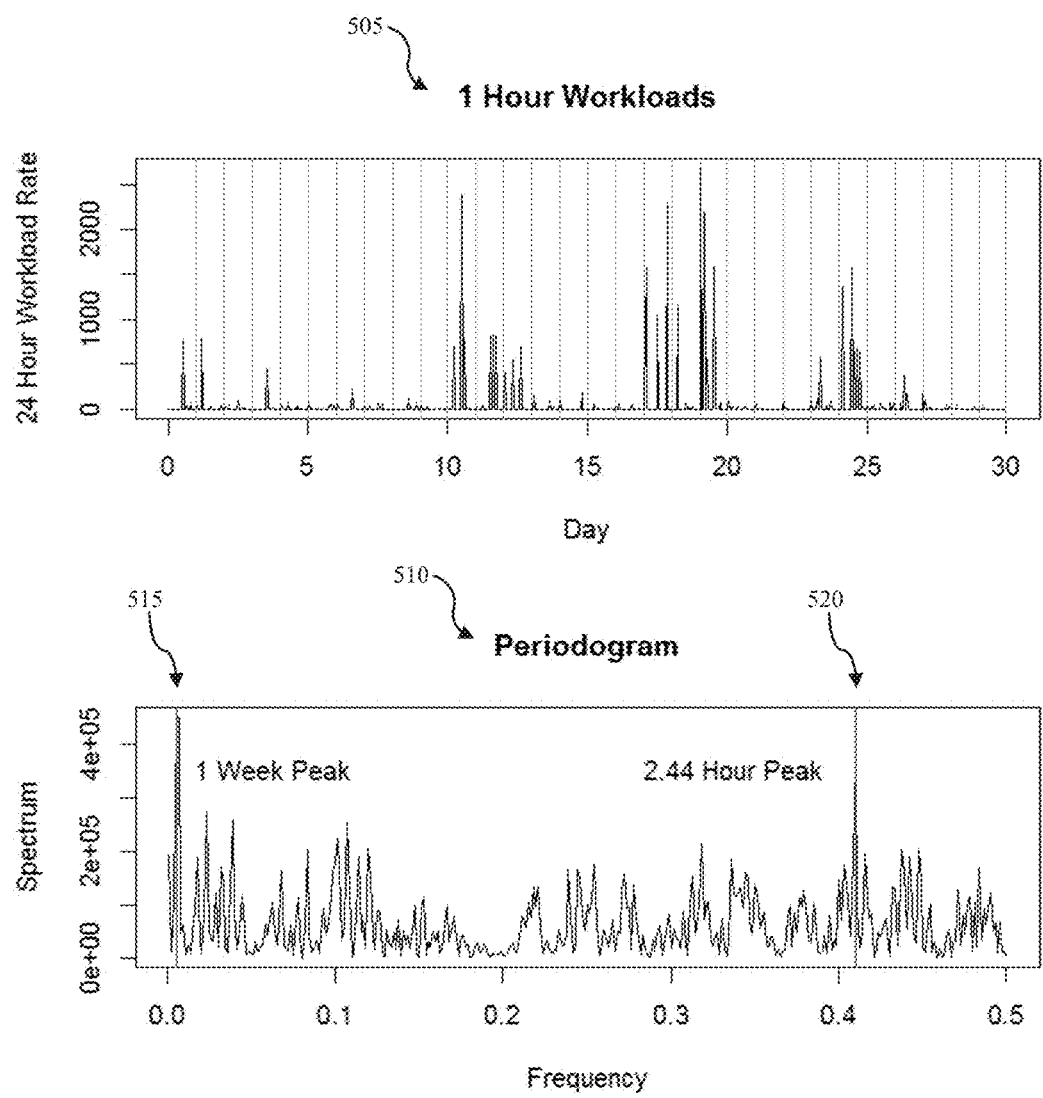
FIG. 5 is a diagram illustrating one example of a graphical set by which the present systems and methods may be implemented.

FIG. 5 is a diagram illustrating one example of a graphical set 500 by which the present systems and methods may be implemented. One or more aspects of the graphical set 500 may be implemented in conjunction with storage management module 130 of FIGS. 1 and/or 2.

Similar to the graphs of FIG. 4, sample workloads may be summarized and analyzed to identify reoccurring periods of non-critical and critical workloads. As illustrated in the exemplary graph 505, workloads for a particular storage device may be summarized into 1 hour bins, scaled at a 24 hour rate, and graphed for a period of 1 month. As illustrated in the exemplary graph 510, summarized workload data may be analyzed using a periodogram. From the periodogram depicted in graph 510, frequencies labeled by 515 and 520 represent several dominant frequencies which indicate possible periodicities of non-critical and critical workload patterns. In this case, 515 and 520 represent the 168 hour and 2.44 hour frequencies, respectively. In some embodiments, selected periodogram frequencies may be incorporated in mathematical models to determine the optimal drive power state.

Figure 6:
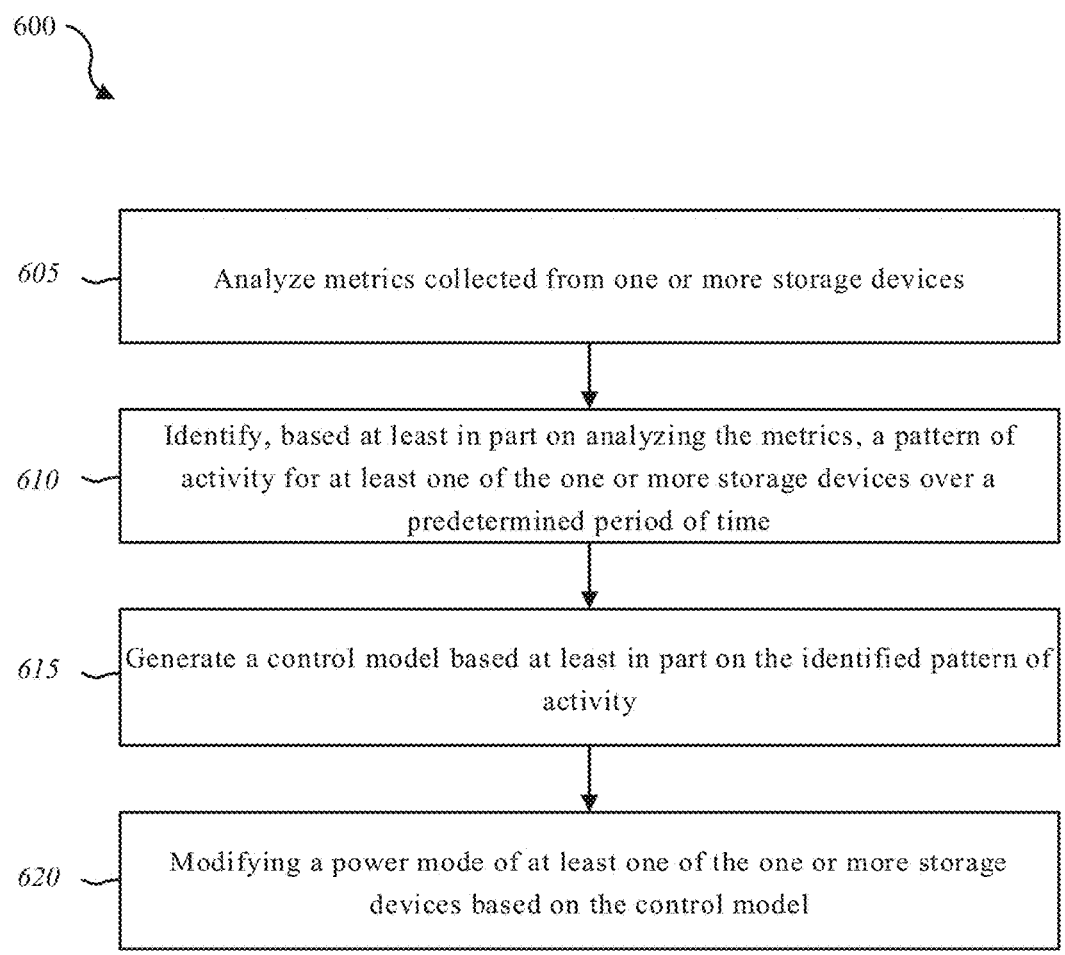
FIG. 6 is a flow diagram illustrating one embodiment of a method for data storage power management.

FIG. 6 is a flow diagram illustrating one embodiment of a method 600 for data storage power management. In some configurations, the method 600 may be implemented by the storage management module 130 illustrated in FIGS. 1 and/or 2. In some configurations, the method 600 may be implemented in conjunction with application 135 and/or a user interface of device 105 in FIG. 1.

At block 605, method 600 may include analyzing metrics collected from one or more storage devices. At block 610, method 600 may include identifying, based at least in part on analyzing the metrics, a pattern of activity for at least one of the one or more storage devices over a predetermined period of time. At block 615, method 600 may include generating a control model based at least in part on the identified pattern of activity. In some cases, the control model may indicate a first time period when at least one of the one or more storage devices is active and a second time period when at least one of the one or more storage devices is inactive. At block 620, the method may include modifying a power mode of at least one of the one or more storage devices based on the control model.

Figure 7:
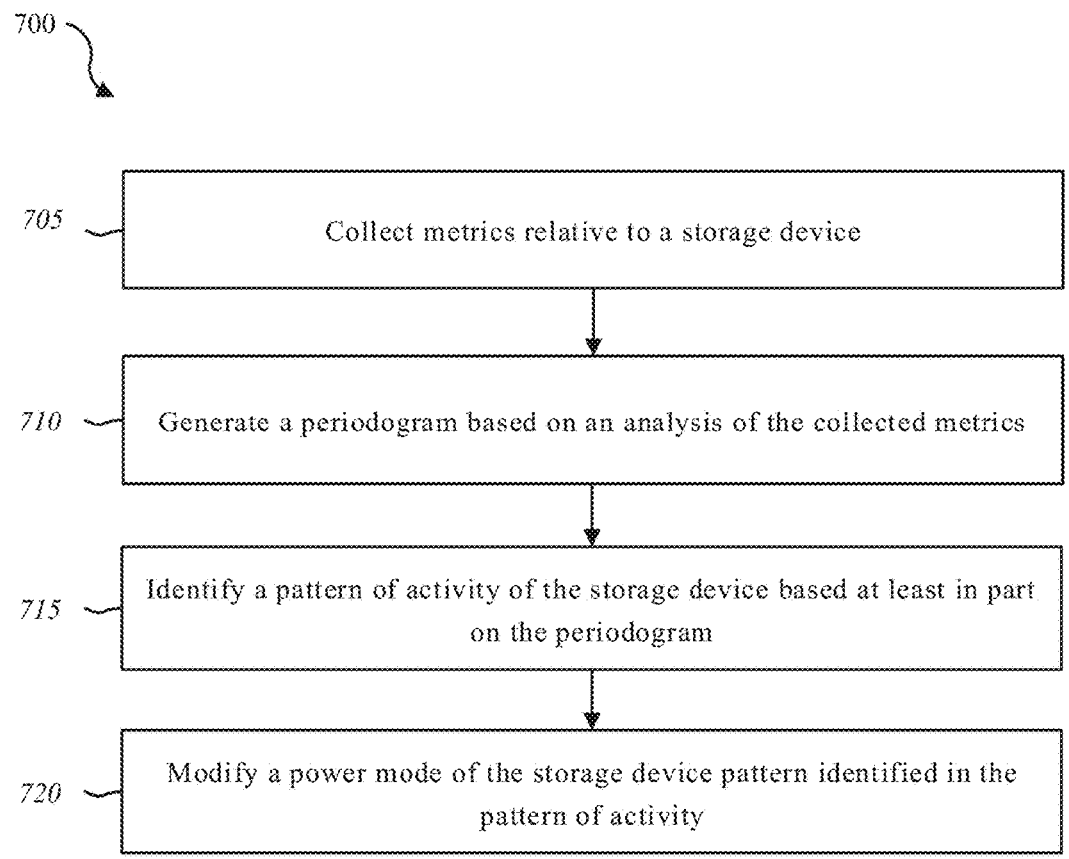
FIG. 7 is a flow diagram illustrating another embodiment of a method for data storage power management.

FIG. 7 is a flow diagram illustrating another embodiment of a method 700 for data storage power management. In some configurations, the method 700 may be implemented by the storage management module 130 illustrated in FIGS. 1 and/or 2. In some configurations, the method 700 may be implemented in conjunction with application 135 and/or a user interface of device 105 in FIG. 1.

At block 705, method 700 may include collecting metrics relative to a storage device. At block 710, method 700 may include generating a periodogram based on an analysis of the collected metrics. In some cases, the periodogram may indicate a frequency of activity and a frequency of inactivity relative to the storage device. In some embodiments, analyzing the metrics may be based at least in part on Fourier analysis of the metrics. The periodogram may be generated based at least in part on the Fourier analysis. At block 715, method 700 may include identifying a pattern of activity of the storage device based at least in part on the periodogram. At block 720, method 700 may include modifying a power mode of the storage device pattern identified in the pattern of activity. In some cases, the power mode may include at least one of an active mode, an idle mode, a standby mode, and a sleep mode.

Figure 8:
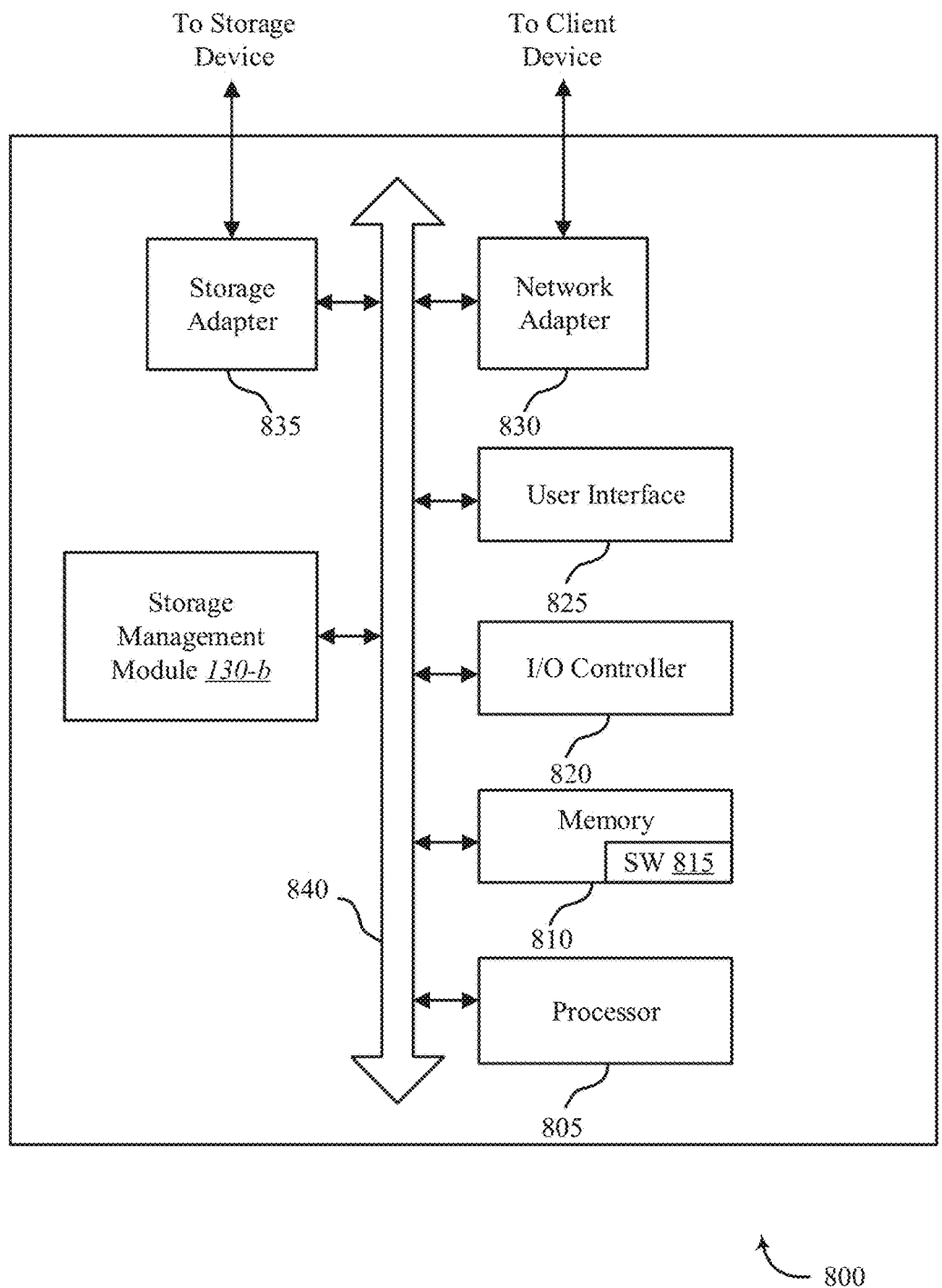
FIG. 8 depicts a block diagram of a computer system suitable for implementing the present systems and methods.

FIG. 8 shows a system 800 for data storage power management, in accordance with various examples. System 800 may illustrate an apparatus, which may be an example of any one of components 105, 115, 120, 125 of FIG. 1. System 800 may include components for bi-directional voice and data communications including components for transmitting communications and components for receiving communications. For example, system 800 may communicate bi-directionally with one or more storage devices and/or client systems. This bi-directional communication may be direct (e.g., system 800 communicating directly with a storage system) and/or indirect (e.g., system 800 communicating indirectly with a client device through a server).

System 800 may include a processor module 805, and memory 810 (including software/firmware code (SW) 815), an input/output controller module 820, a user interface module 825, a network adapter 830, and a storage adapter 835. The software/firmware code 815 may be one example of a software application executing on system 800. The network adapter 830 may communicate bi-directionally, via one or more wired links and/or wireless links, with one or more networks and/or client devices. In some embodiments, network adapter 830 may provide a direct connection to a client device via a direct network link to the Internet via a POP (point of presence). In some embodiments, network adapter 830 of system 800 may provide a connection using wireless techniques, including digital cellular telephone connection, Cellular Digital Packet Data (CDPD) connection, digital satellite data connection, and/or another connection. The system 800 may include a storage management module 130-b, which may perform the functions described above for the storage management module 130 of FIGS. 1, and/or 2.

The signals associated with system 800 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 830 may enable one or more of WWAN (GSM, CDMA, and WCDMA), WLAN (including Wi-Fi), WMAN (WiMAX) for mobile communications, antennas for Wireless Personal Area Network (WPAN) applications (including RFID and UWB), etc.

One or more buses 840 may allow data communication between one or more elements of system 800 (e.g., processor module 805, memory 810, I/O controller module 820, user interface module 825, network adapter 830, and storage adapter 835, etc.).

The memory 810 may include random access memory (RAM), read only memory (ROM), flash RAM, and/or other types. The memory 810 may store computer-readable, computer-executable software/firmware code 815 including instructions that, when executed, cause the processor module 805 to perform various functions described in this disclosure. Alternatively, the software/firmware code 815 may not be directly executable by the processor module 805 but may cause a computer (e.g., when compiled and executed) to perform functions described herein. Alternatively, the computer-readable, computer-executable software/firmware code 815 may not be directly executable by the processor module 805, but may be configured to cause a computer (e.g., when compiled and executed) to perform functions described herein. The processor module 805 may include an intelligent hardware device, e.g., a central processing unit (CPU), a microcontroller, an application-specific integrated circuit (ASIC), etc.

In some embodiments, the memory 810 may contain, among other things, the Basic Input-Output system (BIOS) which may control basic hardware and/or software operation such as the interaction with peripheral components or devices. For example, the storage management module 130-b to implement the present systems and methods may be stored within the system memory 810. Applications resident with system 800 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 830, etc.).

Many other devices and/or subsystems may be connected to one or may be included as one or more elements of system 800 (e.g., personal computing device, mobile computing device, smart phone, server, internet-connected device, cell radio module, and so on). In some embodiments, all of the elements shown in FIG. 8 need not be present to practice the present systems and methods. The devices and subsystems can be interconnected in different ways from that shown in FIG. 8. In some embodiments, an aspect of some operation of a system, such as that shown in FIG. 8, may be readily known in the art and are not discussed in detail in this application. Code to implement the present disclosure can be stored in a non-transitory computer-readable medium such as one or more of system memory 810 or other memory. The operating system provided on I/O controller module 820 may be a mobile operating system, desktop operating system, or another known operating system.

The I/O controller module 820 may operate in conjunction with network adapter 830 and/or storage adapter 835. The network adapter 830 may enable system 800 with the ability to communicate with client devices (e.g., device 105 of FIG. 1), and/or other devices over the network 110 of FIG. 1. Network adapter 830 may provide wired and/or wireless network connections. In some cases, network adapter 830 may include an Ethernet adapter or Fibre Channel adapter. Storage adapter 835 may enable system 800 to access one or more data storage devices (e.g., storage device 125). The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 9:
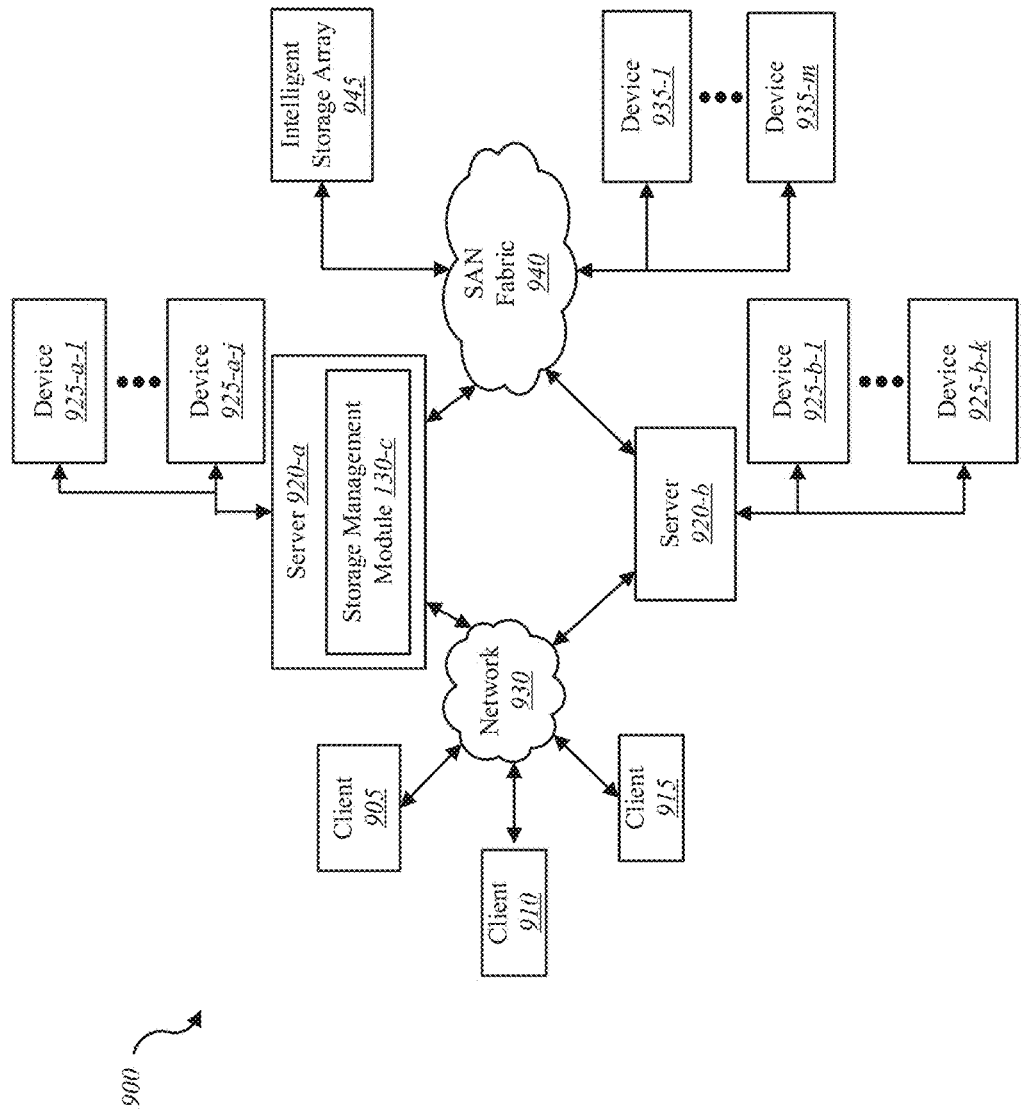
FIG. 9 is a block diagram depicting a network architecture having client systems, as well as storage servers (any of which can be implemented using the computer system).

FIG. 9 is a block diagram depicting a network architecture 900 in which client systems 905, 910 and 915, as well as storage servers 920-a and 920-b (any of which can be implemented using computer system 800), are coupled to a network 930. In one embodiment, storage management module 130-c may be located within one of the storage servers 920-a, 920-b to implement the present systems and methods. Storage management module 130-c may be one example of storage management module 130 depicted in FIGS. 1, 2, and/or 8. The storage server 920-a is further depicted as having storage devices 925-a-1 through 925-a-j directly attached, and storage server 920-b is depicted with storage devices 925-b-1 through 925-b-k directly attached. SAN fabric 940 supports access to storage devices 935-1 through 935-m by storage servers 920-a and 920-b, and so by client systems 905, 910 and 915 via network 930. Intelligent storage array 945 is also shown as an example of a specific storage device accessible via SAN fabric 940.

With reference to computer system 800, network adapter 830 or some other method can be used to provide connectivity from each of client computer systems 905, 910 and 915 to network 930. Client systems 905, 910 and 915 are able to access information on storage server 920-a or 920-b using, for example, a web browser or other client software (not shown). Such a client allows client systems 905, 910 and 915 to access data hosted by storage server 920-a or 920-b or one of storage devices 925-a-1-925-a-j, 925-b-1-925-b-k, 935-1-935-m or intelligent storage array 945. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the present systems and methods and their practical applications, to enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for data storage management, comprising:
    analyzing metrics collected from one or more storage drives;
    generating a periodogram from the analysis of the metrics, the periodogram indicating a frequency of activity and a frequency of inactivity relative to at least one of the one or more storage drives;
    modifying a power mode of at least one of the one or more storage drives based on the periodogram; and
    wherein generating the periodogram is based at least in part on performing machine learning on the metrics to identify at least one temporal pattern or spatial pattern, or both patterns, of the one or more storage drives, the periodogram being generated based at least in part on the machine learning.

2. The method of claim 1, wherein generating the periodogram is based at least in part on Fourier analysis of the metrics, the periodogram being generated based at least in part on the Fourier analysis.

3. The method of claim 1, comprising:
    storing administrator settings, wherein the administrator settings include at least a configuration for performance and a configuration for power savings relative to the one or more storage devices.

4. The method of claim 1, comprising:
    detecting at least one storage drive of the one or more storage drives approaching or entering an active period while in an inactive period.

5. The method of claim 4, comprising:
    upon detecting the at least one storage drive approaching or entering the active period while in the inactive period, placing the at least one storage drive in a standby mode based at least in part on the at least one storage drive having the configuration for power savings, or placing the at least one storage drive in an active mode based at least in part on the at least one storage drive having the configuration for performance.

6. The method of claim 4, comprising:
    detecting a mode transition in relation to the at least one storage drive; and
    upon detecting the mode transition in relation to the at least one storage drive, placing the at least one storage drive in a power mode according to a configuration and a current state of the at least one storage drive.

7. The method of claim 1, wherein the power mode includes at least one of an active mode, an idle mode, a standby mode, and a sleep mode.

8. The method of claim 1, wherein at least one of the one or more storage devices is located in a data storage enclosure comprising at least one tray of storage drives.

9. The method of claim 8, comprising:
    modifying a power mode of the at least one tray of storage drives within the data storage enclosure based at least in part on a spatial pattern identified in the periodogram.

10. A computer-program product, the computer-program product comprising a non-transitory computer-readable medium storing instructions thereon, the instructions being executable by one or more processors to perform the steps of:
    analyzing metrics collected from one or more storage drives;
    generating a periodogram from the analysis of the metrics, the periodogram indicating a frequency of activity and a frequency of inactivity relative to at least one of the one or more storage drives;
    modifying a power mode of at least one of the one or more storage drives based on the periodogram; and
    wherein generating the periodogram is based at least in part on performing machine learning on the metrics to identify at least one temporal pattern or spatial pattern, or both patterns, of the one or more storage drives, the periodogram being generated based at least in part on the machine learning.

11. The computer-program product of claim 10, wherein generating the periodogram is based at least in part on Fourier analysis of the metrics, the periodogram being generated based at least in part on the Fourier analysis.

12. The computer-program product of claim 10, wherein the instructions executed by the one or more processors cause the one or more processors to perform the steps of:
    storing administrator settings, wherein the administrator settings include at least a configuration for performance and a configuration for power savings relative to the one or more storage devices.

13. The computer-program product of claim 10, wherein the instructions executed by the one or more processors cause the one or more processors to perform the steps of:
    detecting at least one storage drive of the one or more storage drives approaching or entering an active period while in an inactive period.

14. The computer-program product of claim 10, wherein the instructions executed by the one or more processors cause the one or more processors to perform the steps of:
    upon detecting the at least one storage drive approaching or entering the active period while in the inactive period, placing the at least one storage drive in a standby mode based at least in part on the at least one storage drive having the configuration for power savings, or placing the at least one storage drive in an active mode based at least in part on the at least one storage drive having the configuration for performance.

15. The computer-program product of claim 10, wherein the instructions executed by the one or more processors cause the one or more processors to perform the steps of:
    detecting a mode transition in relation to the at least one storage drive; and upon detecting the mode transition in relation to the at least one storage drive, placing the at least one storage drive in a power mode according to a configuration and a current state of the at least one storage drive.

16. The computer-program product of claim 10, wherein the power mode includes at least one of an active mode, an idle mode, a standby mode, and a sleep mode.

17. A storage system for storage system management, the storage system comprising a storage server to perform the steps of:
- analyzing metrics collected from one or more storage drives, the analysis of the metrics including Fourier analysis of the metrics;
- generating a periodogram from the analysis of the metrics, the periodogram indicating a frequency of activity and a frequency of inactivity relative to at least one of the one or more storage drives;
- modifying a power mode of at least one of the one or more storage drives based on the periodogram; and
- wherein generating the periodogram is based at least in part on performing machine learning on the metrics to identify at least one temporal pattern or spatial pattern, or both patterns, of the one or more storage drives, the periodogram being generated based at least in part on the machine learning.

* * * * *